(12) United States Patent
Dyal

(10) Patent No.: US 10,094,703 B2
(45) Date of Patent: Oct. 9, 2018

(54) ONBOARD TRAILER WEIGHING SYSTEM ABOVE A KINGPIN

(71) Applicant: Air Ops, LLC, Baxley, GA (US)

(72) Inventor: Carl Mitchell Dyal, Baxley, GA (US)

(73) Assignee: AIR OPS, LLC, Baxley, GA (US)

( * ) Notice: Subject to any disclaimer, the term of this patent is extended or adjusted under 35 U.S.C. 154(b) by 192 days.

(21) Appl. No.: 15/142,590

(22) Filed: Apr. 29, 2016

(65) Prior Publication Data

US 2017/0314986 A1    Nov. 2, 2017

(51) Int. Cl.
| | |
|---|---|
| *G01G 19/08* | (2006.01) |
| *G01G 19/10* | (2006.01) |
| *B62D 21/20* | (2006.01) |
| *B62D 53/06* | (2006.01) |
| *B60D 1/01* | (2006.01) |

(52) U.S. Cl.
CPC ............ *G01G 19/10* (2013.01); *B62D 21/20* (2013.01); *B62D 53/061* (2013.01); *G01G 19/08* (2013.01); *B60D 1/015* (2013.01)

(58) Field of Classification Search
CPC ........ B62D 53/0807–53/0814; B62D 53/0842; B62D 63/08; B60D 1/015; G01G 19/08; G01G 19/10
See application file for complete search history.

(56) References Cited

U.S. PATENT DOCUMENTS

| | | | | |
|---|---|---|---|---|
| 2,646,272 A | * | 7/1953 | Swift ...................... | G01G 5/04 177/141 |
| 2,754,108 A | | 7/1956 | Brown | |
| 2,821,409 A | * | 1/1958 | Chalmers ........... | B62D 53/0807 267/256 |
| 3,119,910 A | | 1/1964 | Meisenheimer et al. | |
| 3,380,758 A | * | 4/1968 | Granning ........... | B62D 53/0821 280/425.1 |
| 3,655,214 A | | 4/1972 | Lane et al. | |
| 3,695,213 A | * | 10/1972 | Littlefield .............. | B60D 1/065 116/200 |

(Continued)

FOREIGN PATENT DOCUMENTS

| | | |
|---|---|---|
| GB | 2136141 | 9/1984 |
| WO | 9416933 | 8/1994 |

(Continued)

OTHER PUBLICATIONS

Dyal, Carl Mitchell; International Search Report and Written Opinion for PCT Application No. PCT/US16/30108, filed Apr. 29, 2016, dated Aug. 18, 2016, 9 pgs.

(Continued)

*Primary Examiner* — Randy Gibson
(74) *Attorney, Agent, or Firm* — Taylor English Duma LLP

(57) ABSTRACT

A trailer includes: a chassis; a floating coupling apparatus coupled to the chassis, a portion of the floating coupling apparatus configured to move in a vertical direction relative to the chassis; a kingpin attached to the floating coupling apparatus; a displacement-sensing device positioned between an attachment portion on the chassis and an attachment portion on the floating coupling apparatus, the displacement-sensing device configured to sense a load acting on the displacement-sensing device; and a fluid system in fluid communication with the displacement-sensing device.

20 Claims, 12 Drawing Sheets

(56) References Cited

U.S. PATENT DOCUMENTS

| | | | | |
|---|---|---|---|---|
| 3,854,540 | A * | 12/1974 | Holmstrom, Jr. | G01G 3/1404 177/136 |
| 4,102,184 | A | 7/1978 | Castleberry | |
| 4,103,752 | A * | 8/1978 | Schmidt | G01G 19/10 177/141 |
| 4,566,716 | A * | 1/1986 | Modat | B62D 53/0807 280/439 |
| 4,630,227 | A | 12/1986 | Hagenbuch | |
| 4,792,004 | A * | 12/1988 | Sheffield | G01G 19/10 177/141 |
| 4,832,141 | A * | 5/1989 | Perini | G01G 19/10 177/141 |
| 4,854,407 | A | 8/1989 | Wagner | |
| 5,040,815 | A * | 8/1991 | Evans | B62D 53/065 280/425.2 |
| 5,167,289 | A | 12/1992 | Stevenson | |
| 5,388,849 | A * | 2/1995 | Arsenault | B62D 53/068 267/122 |
| 5,410,109 | A * | 4/1995 | Tarter | G01G 19/12 177/136 |
| 5,478,974 | A * | 12/1995 | O'Dea | G01G 19/10 177/136 |
| 5,610,372 | A * | 3/1997 | Phillips | G01G 19/086 177/1 |
| 5,780,782 | A * | 7/1998 | O'Dea | G01G 23/01 177/136 |
| 5,785,341 | A * | 7/1998 | Fenton | B62D 53/0821 267/35 |
| 6,025,563 | A | 2/2000 | Lesesky | |
| 6,037,550 | A | 3/2000 | Bradley | |
| 6,363,331 | B1 | 3/2002 | Kyrtsos | |
| 6,921,100 | B2 * | 7/2005 | Mantini | B60G 17/005 177/137 |
| 7,142,102 | B2 | 11/2006 | Darroman | |
| 7,530,591 | B2 * | 5/2009 | Mater, Jr. | B60D 1/50 280/416.1 |
| 7,572,988 | B1 | 8/2009 | Morton | |
| 8,100,427 | B2 * | 1/2012 | Mater, Jr. | B60D 1/60 280/433 |
| 8,424,892 | B2 * | 4/2013 | Hapyuk | B60G 17/018 177/136 |
| 8,471,721 | B2 | 6/2013 | Tong | |
| 8,981,918 | B2 | 3/2015 | Panse | |
| 8,981,919 | B2 | 3/2015 | Massey | |
| 9,205,883 | B2 * | 12/2015 | Bennett | B62D 53/085 |
| 9,643,462 | B2 * | 5/2017 | McAllister | B60D 1/06 |
| 9,796,227 | B2 * | 10/2017 | McAllister | B60D 1/62 |
| 2008/0029996 | A1 | 2/2008 | Mater et al. | |
| 2008/0296867 | A1 * | 12/2008 | Bouwkamp | B62D 53/0842 280/439 |
| 2011/0036646 | A1 | 2/2011 | Dack | |
| 2013/0175786 | A1 * | 7/2013 | Curl | B62D 53/0828 280/439 |
| 2014/0309844 | A1 | 10/2014 | Breed | |
| 2015/0137482 | A1 | 5/2015 | Woolf et al. | |

FOREIGN PATENT DOCUMENTS

| | | |
|---|---|---|
| WO | 2002003346 | 1/2002 |
| WO | 2017188990 | 11/2017 |

OTHER PUBLICATIONS

Dyal, Carl Mitchell; PCT Application entitled: Trailer Weighing System, having serial No. PCT/US16/30108, filed Apr. 29, 2016, 34 pgs.

anythingtruck.com; Article entitled: "Firestone W01-358-7135 Air Bag, Replaces Neway 90557001 Air Spring", located at <http://www.anythingtruck.com/product/htp-suspension-airsprings-convoluted/280-7135.html >, accessed on Jan. 30, 2016, 2 pgs.

Air-Weigh; Article entitled: "Loadmaxx Trailer", located at <http://www.air-weigh.com/loadmaxx-trailer/>, accessed on Nov. 24, 2015, 5 pgs.

Air-Weigh; Article entitled: "LoadMaxx Straight Truck", located at <http://www.air-weigh.com/loadmaxx-straight-truck/>, accessed on Nov. 24, 2015, 5 pgs.

Air-Weigh, Article entitled: "LoadMaxx Trailer Scale User Guide", publicly available prior to Apr. 29, 2016, 32 pgs.

Air-Weigh, Article entitled: "LoadMaxx Trailer Scale Installation Guide", publicly available prior to Apr. 29, 2016, 24 pgs.

\* cited by examiner

ONBOARD TRAILER WEIGHING SYSTEM ABOVE A KINGPIN

TECHNICAL FIELD

Field of Use

This disclosure relates to vehicle weighing systems. More specifically, this disclosure relates to self-contained weighing systems on a trailer.

Related Art

Trailers are often used to carry cargo on both public and private roads. A trailer used on a public roadway may need to be weighed at various checkpoints to ensure that the trailer is not overloaded. An overloaded trailer can result in fines being levied against the driver or owner of the trailer, while a partially loaded trailer can result in underutilization of the trailer and also the operator's time and other resources. When loading a trailer in a remote location, a scale is not typically available.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a trailer comprising: a chassis; a floating coupling apparatus coupled to the chassis, a portion of the floating coupling apparatus configured to move in a vertical direction relative to the chassis; a kingpin attached to the floating coupling apparatus; a displacement-sensing device positioned between an attachment portion on the chassis and an attachment portion on the floating coupling apparatus, the displacement-sensing device configured to sense a load acting on the displacement-sensing device; and a fluid system in fluid communication with the displacement-sensing device.

In a further aspect, disclosed is a weighing system for a trailer, the system comprising: a fifth wheel plate; a kingpin fixably attached to the fifth wheel plate and configured to slideably and lockably fit within a coupling aperture of a fifth wheel of a vehicle; a fixed rail attached to a chassis of the trailer; and a floating rail slideably attached to the fixed rail.

In yet another aspect, disclosed is a method of using a trailer, the method comprising: loading the trailer with a target load, the trailer comprising: a floating coupling apparatus; a fluid system comprising a displacement-sensing device coupled to the floating coupling apparatus and configured to sense movement of the floating coupling apparatus relative to the chassis; and a load indicator; measuring the displacement of a portion of the floating coupling apparatus relative to the chassis with the displacement-sensing device; and signaling via the load indicator when the load has reached the target load.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention. The drawings are not necessarily drawn to scale. Corresponding features and components throughout the figures may be designated by matching reference characters for the sake of consistency and clarity.

DETAILED DESCRIPTION

Figure 1:
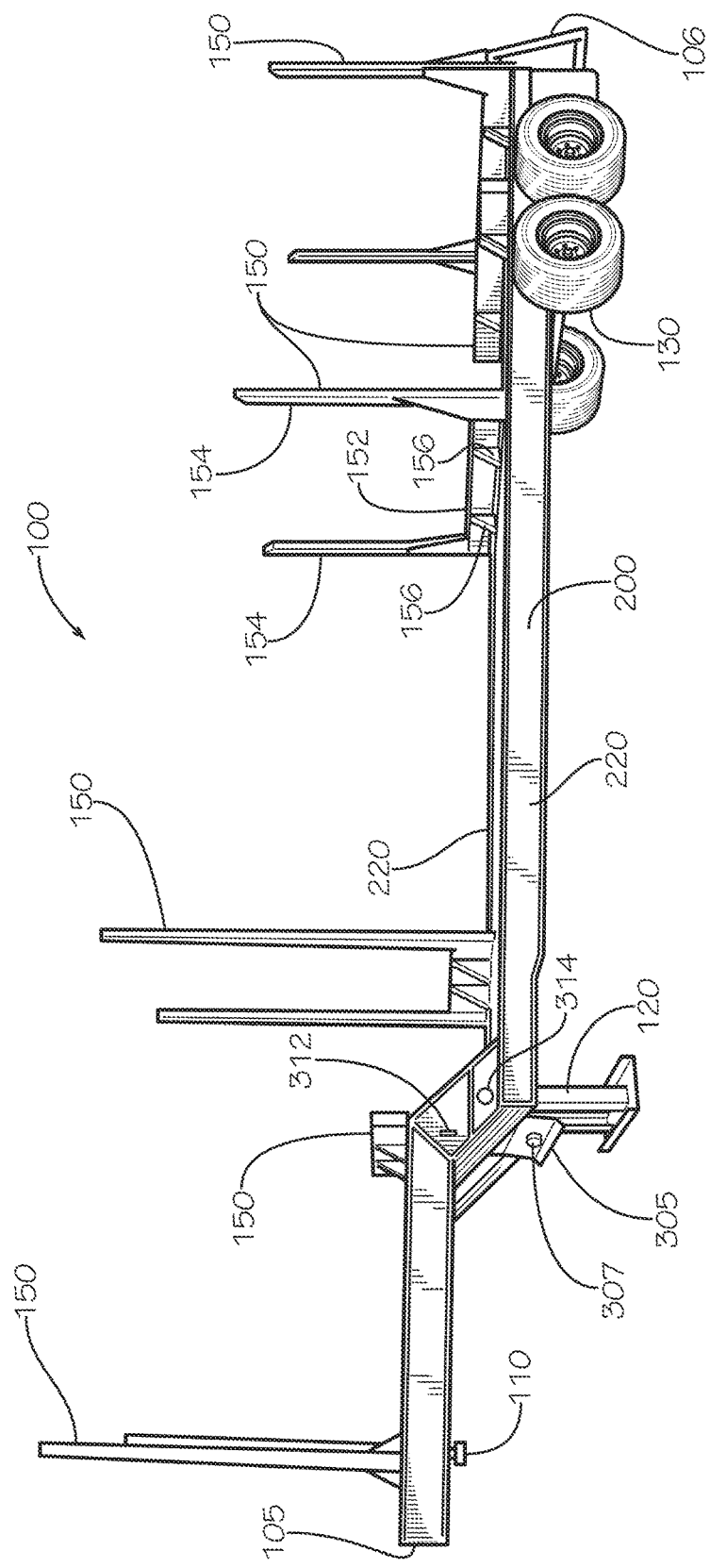
FIG. 1 is a perspective view of a trailer comprising an on-board weighing system in accordance with one aspect of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the one aspect of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a quantity of one of a particular element can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "upper," "lower," "inside," "outside," "inboard," or "outboard" may be referenced. Unless stated otherwise here or in the figures, "front" describes that end of the trailer that is configured to couple to a tow vehicle; "rear" is that end of the trailer that is opposite or distal the front of the trailer and is configured to trail the front of the trailer when the trailer is moving in a forward direction; "left" is that which is to the left of or facing left from a person standing inside the drying trailer and facing towards the front of the drying trailer; and "right" is that which is to the right of or facing right from a person standing inside the drying trailer and facing towards the front of the drying trailer.

In one aspect, a trailer and associated methods, systems, devices, and various apparatuses are disclosed herein. In one aspect, the trailer is a self-weighing trailer and can comprise a chassis and an onboard weighing system. In another aspect, the trailer can additionally comprise a king pin, landing gear, a wheel assembly, and structures for containing a load within or on top of the trailer.

In one aspect, FIG. 1 discloses one embodiment of a trailer 100. The trailer 100 comprises a chassis 200 and a weighing system 300 (shown in FIG. 2). The trailer 100 can additionally comprise a kingpin 110, landing gear 120, and a wheel assembly 130. In one aspect, the weighing system 300 is located onboard the trailer 100 itself in a position, for example and without limitation, proximate to the landing gear 120 and behind an access panel 305 optionally comprising a latch 307. As shown in FIG. 1, the access panel 305 is unlatched and hinged open.

Figure 4:
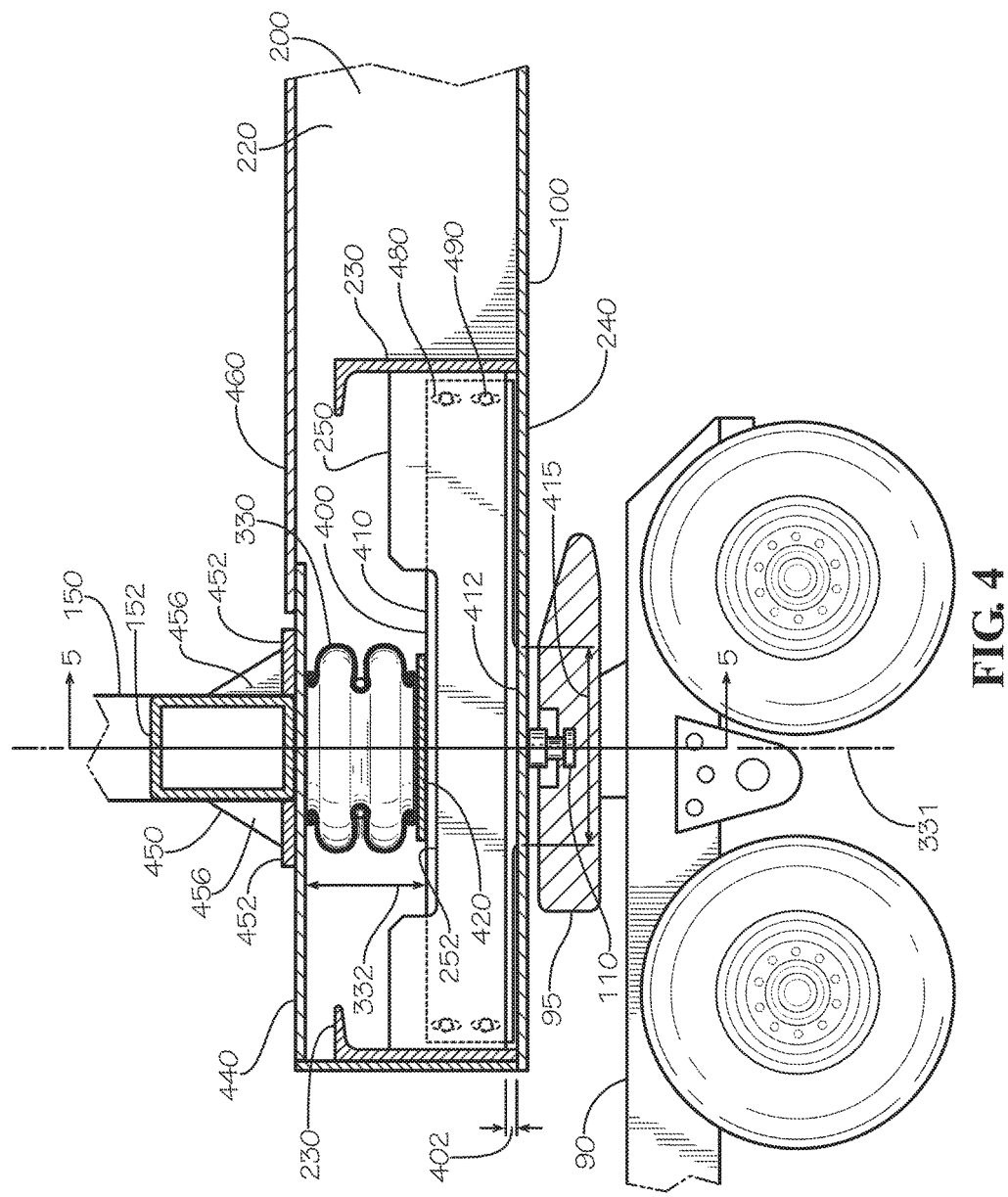
FIG. 4 is a sectional view of the trailer of FIG. 1 taken along line 4-4 of FIG. 2 with the trailer in an unloaded condition.

The chassis 200, which can be divided into a main section proximate to a trailer rear 106 and a neck section proximate to a trailer front 105, comprises a pair of side members 220, a plurality of cross members 230 (shown in FIG. 2) that join and reinforce the side members 220 at the front and rear of the trailer 100 and at various points therebetween, and a fixed rail 250 (shown in FIG. 4). Each side member 220 is substantially aligned with a longitudinal direction of the trailer 100 and extends between and comprises the main section and the neck section. In one aspect, each cross member 230 is optionally secured to each of the side members 220 with a weldment (i.e., by welding) and is positioned substantially orthogonal to the longitudinal direction of the trailer 100. The fixed rail 250 is aligned along a longitudinal direction of the trailer 100 and secured between a pair of cross members 230 by welding. In another aspect, the cross members 230 can be secured to the side members 220 or the fixed rail 250 can be secured to the cross members 230 by any one of a number of fastening methods including, for example and without limitation, rivets and bolts. For example and without limitation, the fixed rail 250 can be formed from steel having a thickness of ½ inch. Each of the side members 220 can be an I-beam.

In one aspect, the trailer 100 comprises a structure for supporting a load. The trailer 100 can comprise, for example and without limitation, a plurality of bolsters 150 for supporting timber logs or other cargo on the trailer 100. Each bolster, which can also be called a log rack, can comprise a horizontal member 152, a pair of upright members 154, and a plurality of braces 156. Each upright member 154 can be attached proximate to an outer edge of a one of the plurality of horizontal members 152. Each horizontal member 152 can be attached, for example and without limitation, to the side members 220 of the chassis 200 by the braces 156. In another aspect, the chassis 200 can comprise any structure able to contain or otherwise support a load including a flat bed, a removable shipping container, or an enclosed box. While the trailer 100 is a logging trailer in one aspect, it is contemplated that the weighing system 300 can be used with any trailer having any chassis and any number of axles and wheels and can be used with trailers used in tandem with one trailer trailing behind another.

The weighing system 300 comprises an electrical circuit comprising a mode switch 312 and a load indicator 314. In one aspect, the weighing system 300 comprises a plurality of displacement-sensing devices in communication with one another. The plurality of displacement-sensing devices can comprise a plurality of air bags in fluid communication with one another.

Figure 2:
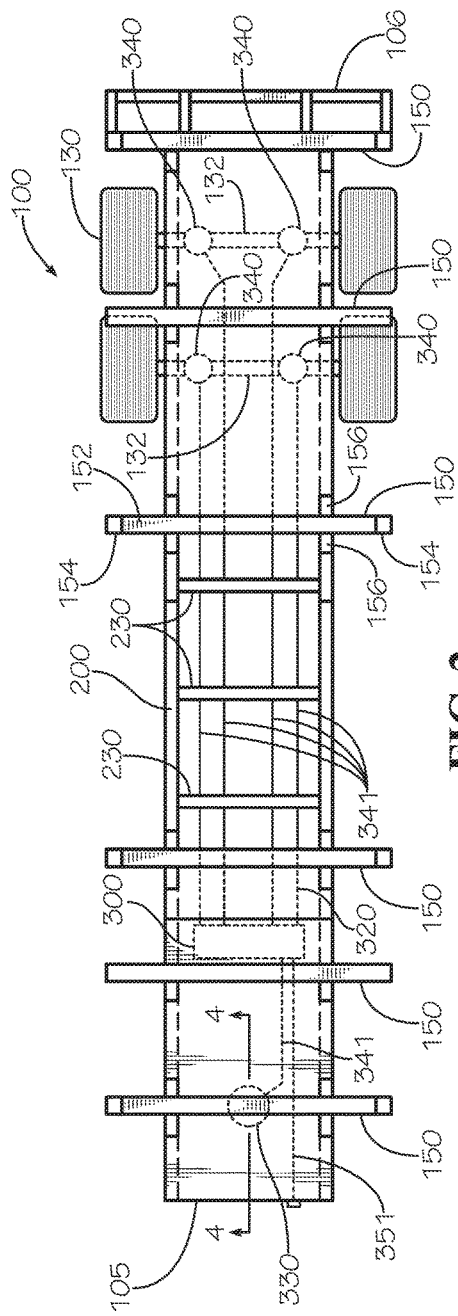
FIG. 2 is a top view of the trailer of FIG. 1.

As shown in FIG. 2, a displacement-sensing device—and more specifically, a fifth wheel air bag 330 positioned proximate to the trailer front 105—is in fluid communication with a plurality of displacement-sensing devices—more specifically, axle air bags 340—positioned proximate to the trailer rear 106 and above each of a pair of rear axles 132.

The fifth wheel air bag 330 and each of the axle air bags 340 are in fluid communication with one another through fluid lines 341 and form at least part of a closed fluid circuit 320. In another aspect, the fluid circuit 320 is connected to a fluid supply line 351, which can be coupled to a pressurized fluid supply (not shown) that is located outside the trailer 100. Each of the fluid lines 341 and the fluid supply line 351 can be situated as shown in FIG. 2 or can be routed along or inside the trailer 100 to reduce the risk of damage during use.

Figure 3:
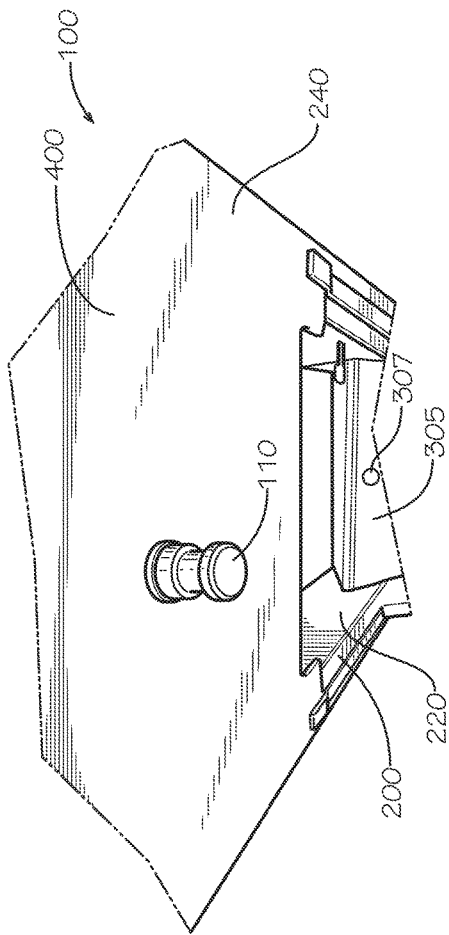
FIG. 3 is bottom perspective view of a front portion of the trailer of FIG. 1 comprising a kingpin.

As shown in FIGS. 3-8, the weighing system 300 comprises a floating coupling apparatus 400. As shown in FIG. 3, looking at the floating coupling apparatus 400 from the bottom, the floating coupling apparatus 400 comprises a fifth wheel plate 240, the kingpin 110, the fixed rail 250, and a floating rail 410.

As shown in FIG. 4, the kingpin 110 is fixably attached to the fifth wheel plate 240 and is configured to slideably and lockably fit within a coupling aperture (not shown) of a fifth wheel 95 of a vehicle 90 configured to tow the trailer 100. The fixed rail 250 is suspended between and attached to each of two cross members 230 of the chassis 200. The fixed rail 250, in one aspect, is also suspended a gap distance 402 above an inner surface or top surface of the fifth wheel plate 240 and defines a notch 252 that is shaped so as not to interfere with the fifth wheel air bag 330. In one aspect, the floating rail 410 defines a plurality of slots 480 and the fixed rail 250 defines a plurality of holes 280 (shown in FIG. 6) through which a plurality of fasteners 490 extend to limit movement of the floating rail 410 with respect to the fixed rail 250. In another aspect, the floating rail 410 defines a plurality of holes and the fixed rail 250 defines a plurality of slots through which the fasteners 490 extend. Each of the fasteners 490 can be, for example and without limitation, a bolt and nut combination having a nominal diameter of approximately ¾ to ⅞ inch and having a Grade 8 hardness or strength rating. In one aspect, the floating coupling apparatus 400 including a portion of the floating rail 410 is attached to a portion of the fifth wheel plate 240 at a connection 412 which can comprise a weldment. In FIG. 4, the connection 412 measures a total length 415 from front to rear along a longitudinal length of the trailer 100.

As shown, the fifth wheel air bag 330 can be a double-convoluted air bag or any other type of air bag configured to contain a fluid under pressure. In one aspect, one end of the fifth wheel air bag 330 is attached to the floating rail 410 at an attachment portion—optionally through a support plate 420 as shown—and the other end of the fifth wheel air bag 330 is attached to a top plate 440 that is attached to the side members 220 and partially encloses the chassis 200. An unloaded height 332 is defined between an inner surface of the top plate 440 and the top surface of the support plate 420. In another aspect, the fifth wheel air bag 330 is attached directly to the floating rail 410 or, in yet another aspect, is attached directly to a pair of floating rails 410.

The fifth wheel air bag 330 can be aligned with the kingpin 110 along an axis 331 in one aspect. The fifth wheel air bag 330 can be aligned with one of the plurality of bolsters 150 along an axis 331 in another aspect. When the bolster 150 is aligned with the fifth wheel air bag 330, the connection between the bolster 150 and the chassis 200 can comprise a load distribution structure 450 comprising a pair of reinforcement plates 452 and a plurality of braces 456. It is through the load distribution structure 450 that the load on the trailer 100 is transmitted to the fifth wheel air bag 330. Optionally, a portion of the chassis is covered by a cover plate 460. As shown in FIG. 4, the cover plate 460 covers an opening defined in the top plate 440.

Figure 5:
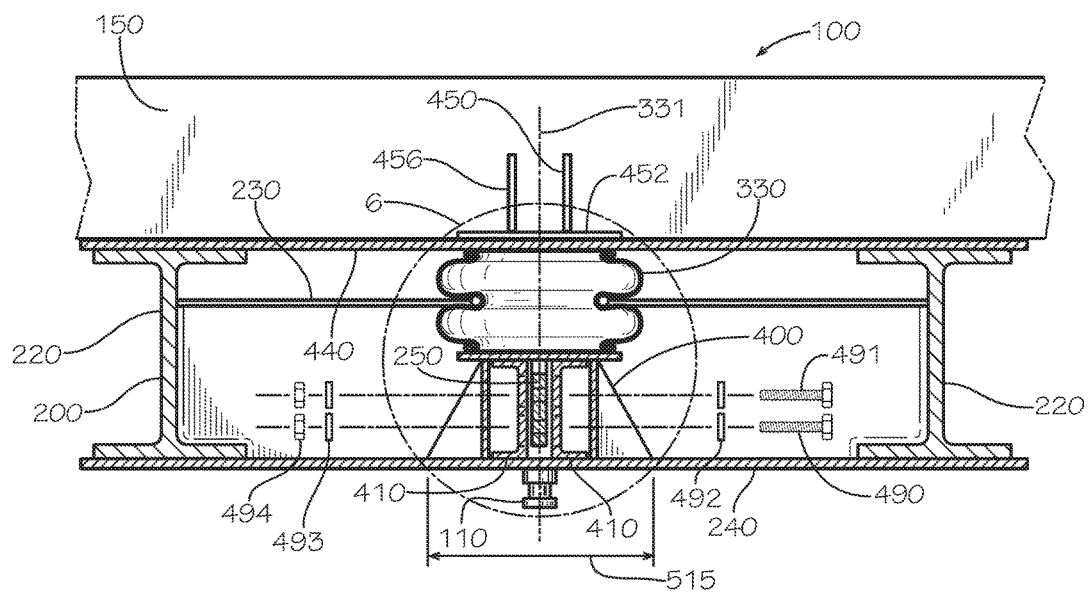
FIG. 5 is a sectional view of the trailer of FIG. 1 taken along line 5-5 of FIG. 4.

As shown in FIG. 5, a sectional view of the trailer 100 looking rearward shows the chassis 200 comprising the side members 220, the fifth wheel plate 240 attached to bottom surfaces of the side members 220, the top plate 440 attached to top surfaces of the side members 220, the cross member 230, and the bolster 150 that is located proximate to the front 105 of the trailer 100 and above the kingpin 110. In FIG. 5, the kingpin 110 and the bolster 150 are shown not in sectional view but in full side view. In one aspect, each of the plurality of fasteners 490 comprises a bolt 491, a nut 494 securable to threads of the bolt 491, a washer 492 between a head of the bolt and the surface of the floating rail 410 against which the head of the bolt contacts, and a washer 493 between the nut 494 and the surface of the floating rail 410 against which the nut 494 contacts. The bolt 491, the washers 492,493, or the nut 494 can be reduced in size, truncated, or otherwise modified to fit in the available space. In FIG. 4, the connection 412 measures a total width 515 from left to right along a transverse direction of the trailer 100.

Figure 6:
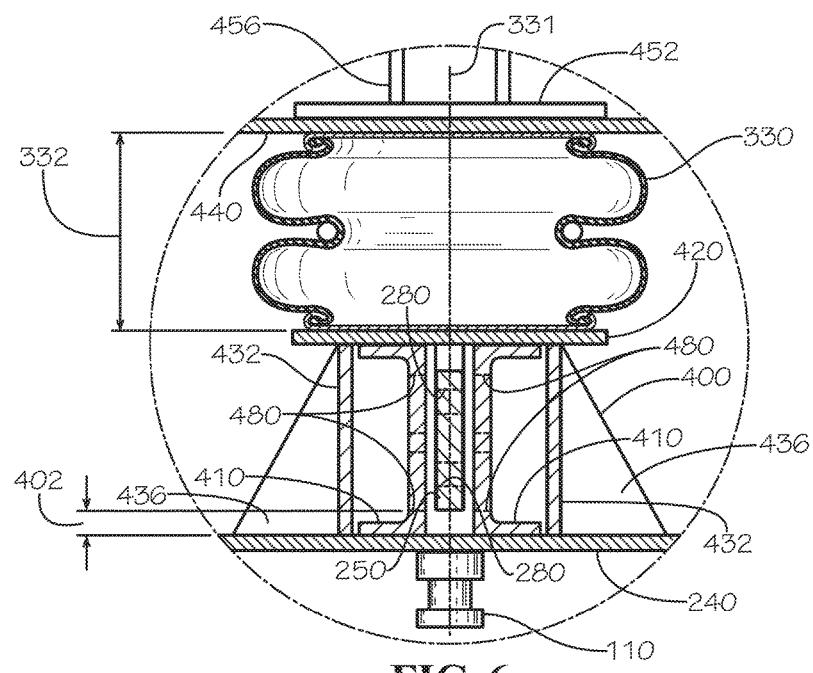
FIG. 6 is a detail sectional view of the trailer of FIG. 1 taken from detail 6 of FIG. 5.

As shown in FIG. 6, the floating coupling apparatus 400 comprises a plurality of plates 432 and a plurality of braces 436 attached to the plurality of plates 432 and to the fifth wheel plate 240. In one aspect, the kingpin 110 is shown protruding from the fifth wheel plate 240. In other aspects, the kingpin 110 comprises a plated base (not shown) that is attached to or contained within the fifth wheel plate 240. With the trailer 100 in an unloaded condition as shown in FIGS. 1-8, shown again in FIG. 6 is the unloaded height 332 as measured between the top plate 440 and the support plate 420. As shown in FIG. 6, each of the plurality of holes 280 in the fixed rail 250 and each of the plurality of slots 480 in the floating rails 410 define an axial direction that is oriented along a horizontal direction. In addition, the fifth wheel plate 240, the support plate 420, and the fixed rail 250 define a gap in a vertical direction between the fixed rail 250 and the fifth wheel plate 240 and optionally a gap in a vertical direction between the fixed rail 250 and the support plate 420. In one aspect, the fifth wheel air bag 330 directly contacts or is secured directly to at least one of the floating rails 410. In another aspect, the fifth wheel air bag 330 is connected to at least one of the floating rails 410 through the support plate 420 or another intervening component.

Figure 7:
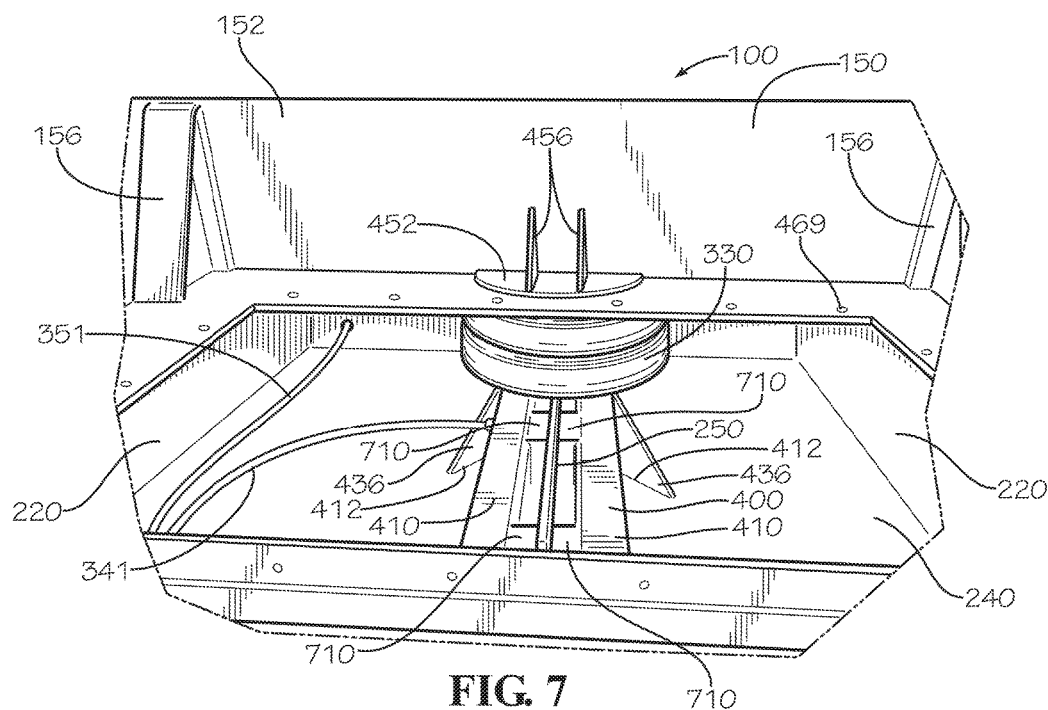
FIG. 7 is a top perspective view of a floating coupling apparatus of the trailer of FIG. 1 with a cover plate removed in accordance with another aspect of the current disclosure.

FIG. 7, in which the cover plate 460 is removed to reveal a plurality of attachment holes 469, shows another perspective of the floating coupling apparatus 400 and the chassis 200. As shown in FIG. 7, a plurality of spacer blocks 710 can be positioned between each of the floating rails 410 and the fixed rail 250 and can be attached to either the floating rails 410 or the fixed rail 250 to restrict side-to-side movement of the floating coupling apparatus 400 including the floating rails 410 with respect to the fixed rail 250.

Figure 8:
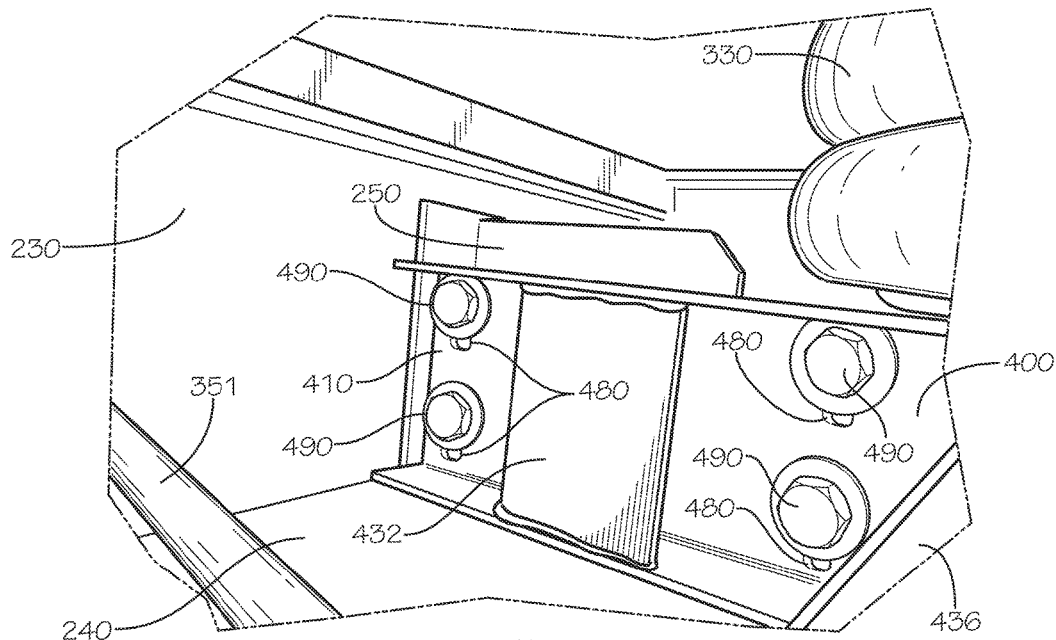
FIG. 8 is a side perspective view of a portion of the floating coupling apparatus of FIG. 7.

As shown in FIG. 8, additional fasteners 490 can be used to connect the fixed rail 250 to the floating rails 410 not only at locations proximate to a first end and a second end of each of the fixed rail 250 and the floating rails 410 but at any desirable locations between a first end and a second end of the fixed rail 250 and the floating rails 410. One of the plates 432 is shown welded to one of the floating rails 410. With the exception of where the floating rail 410 is welded to the fifth wheel plate 240 at the connection 412 (shown previously), however, the floating rail 410 is not welded to either the fifth wheel plate 240, the cross member 230, or the fixed rail 250.

Figure 9:
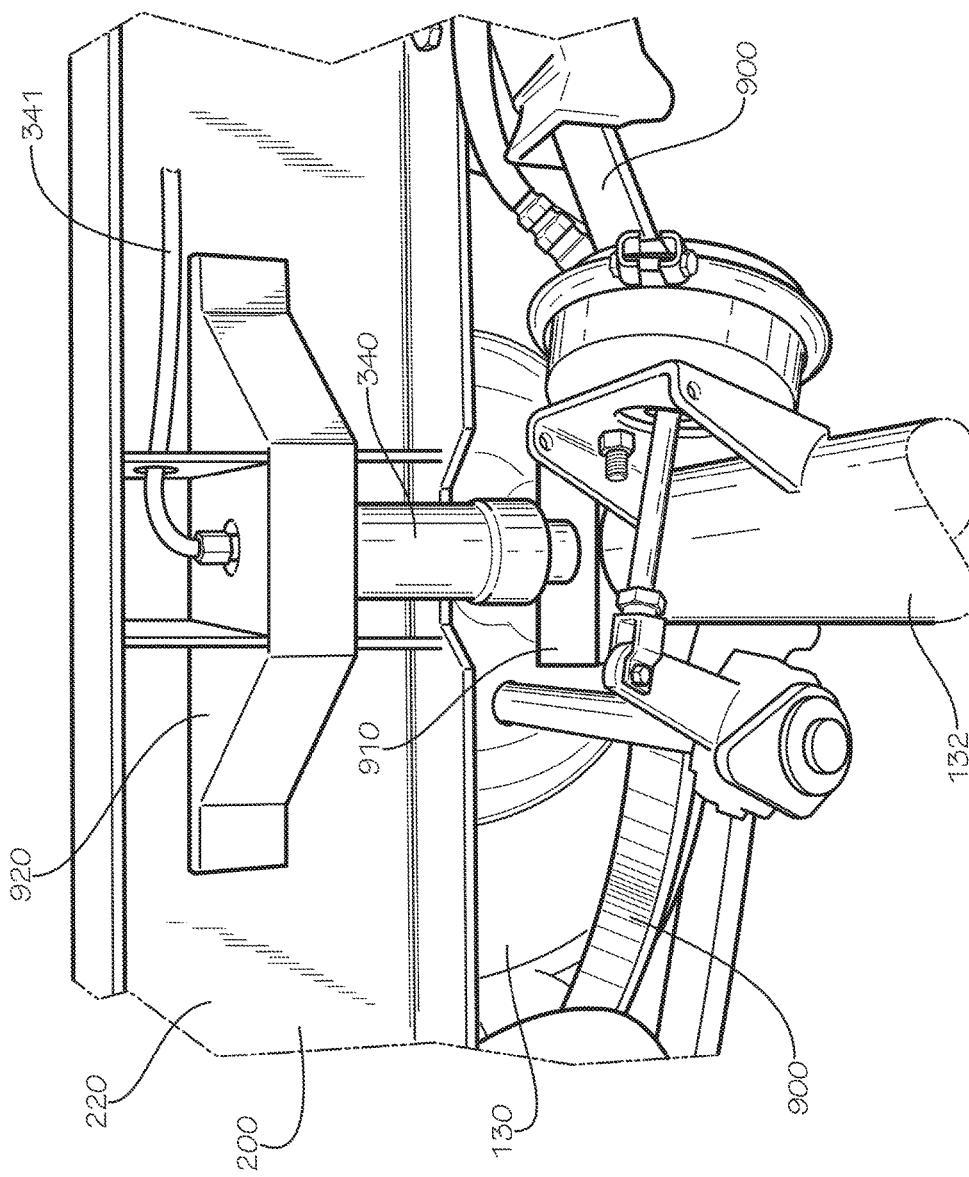
FIG. 9 is a side perspective view of the trailer of FIG. 1 showing an axle air bag proximate to a rear axle on a left side of the trailer.

The trailer 100 additionally comprises at least one axle 132. In one aspect, the trailer 100 comprises two axles 132, a first axle 132, and a second axle 132. As shown in FIG. 9, a left end of the first axle 132 is coupled to and suspended from the chassis 200 with a first leaf spring 900 and a second leaf spring (not shown) on left and right sides, respectively, of the chassis 200 and configured to receive a wheel of the wheel assembly 130 on each of two ends. In another aspect, the leaf spring 900 is configured to suspend the chassis 200 above the axle 132. The second axle 132 is coupled to the chassis 200 with a third leaf spring (not shown) and a fourth leaf spring (also not shown) on left and right sides, respectively, of the chassis 200 and configured to receive a wheel of the wheel assembly 130 on each of two ends. Attached to the side member 220 of the chassis 200 is a chassis mount 920. Attached to the axle 132 is an axle mount 910. In one aspect, the axle air bag 340 is positioned between an attachment portion on the chassis and the axle 132 of the trailer and is in fluid communication with the fifth wheel air bag 330. As shown in FIG. 9, assembled between the axle mount 910 and the chassis mount 920 is the axle air bag 340, which is incorporated into the fluid circuit 320 via the fluid line 341. In one aspect, the use of an axle air bag 340 in combination with a leaf spring helps prolong the life of the leaf spring and the associated parts including any bushings (not shown). In another aspect, the axle air bag 340 can be used in combination with an air-ride system on a trailer already utilizing air bags in its suspension system.

Figure 10:
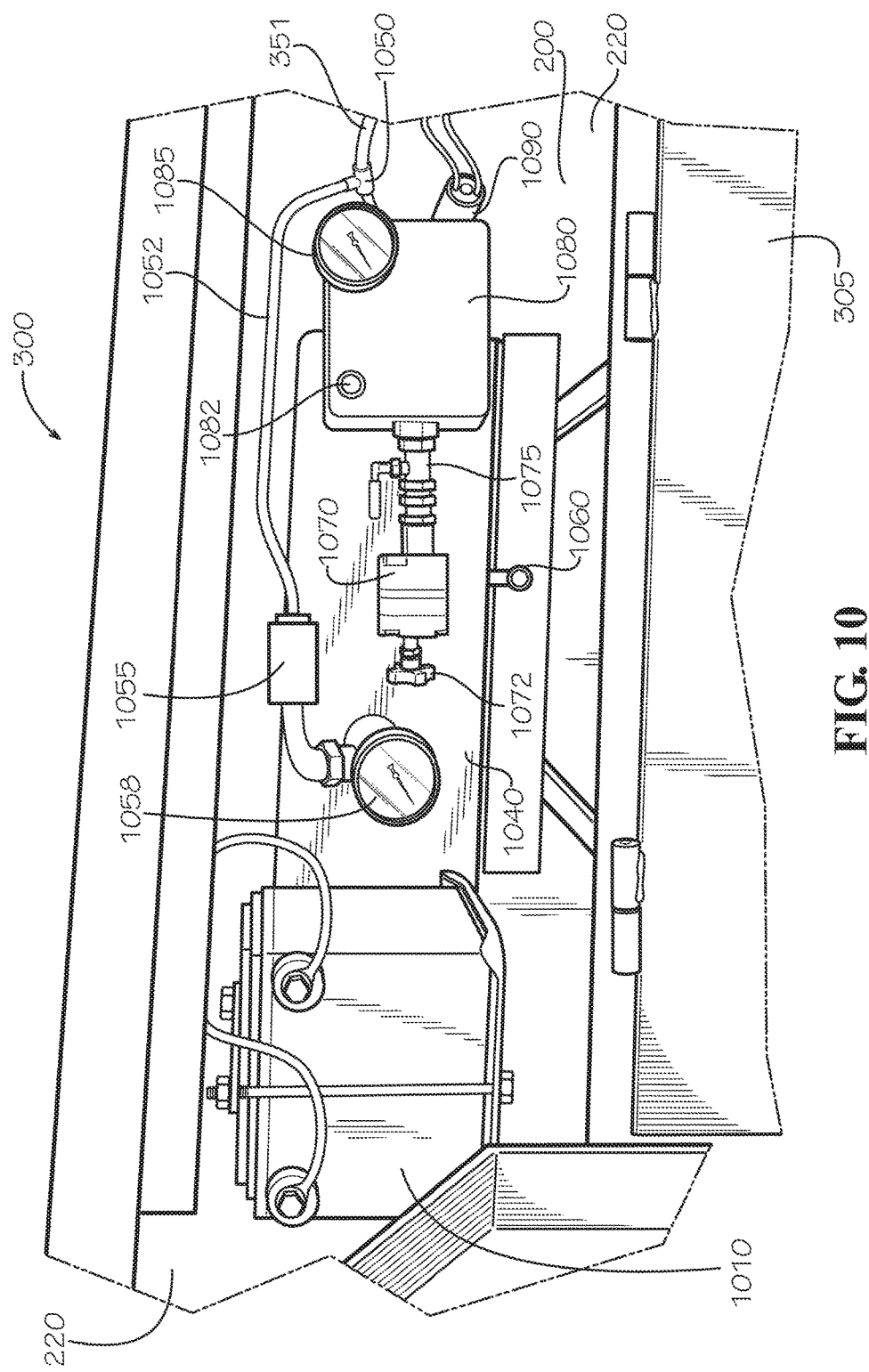
FIG. 10 is a perspective view of a portion of the on-board weighing system of the trailer of FIG. 1.

As shown in FIG. 10, the onboard weighing system 300 of the trailer 100 can be positioned at least partly inside the chassis 200 between the side members 220 and comprises a fluid circuit 320, which can also be considered a fluid system. The fluid supply connection 1050 is sized to receive the fluid supply line 351 and draws such fluid contained within the fluid supply line 351 into the fluid reservoir 1040 through a fluid line 1052 positioned therebetween. The fluid reservoir 1040 is in fluid communication with the fluid supply connection 1050 and comprises a manual fill valve 1060. A check valve 1055 is positioned between and in fluid communication with the fluid supply connection 1050 and the fluid reservoir 1040 and is configured to restrict flow of the fluid in only one direction 1056. Using the check valve 1055, fluid that enters the fluid reservoir 1040 does not reverse flow out of the fluid reservoir. A pressure gage 1058 can be used to measure the pressure of the fluid inside the fluid reservoir 1040.

The fluid circuit 320 is divided into a high-pressure side and a low-pressure side by a fluid regulator 1070 that is in fluid communication with the fluid reservoir 1040. In one aspect, the connection between the fluid regulator 1070 and the fluid reservoir 1040 is located behind the fluid regulator 1070 and is not visible in FIG. 10. The fluid regulator 1070 is configured to maintain a desired pressure in the low-pressure side of the fluid circuit 320 beyond the fluid regulator 1070 and can comprise a knob 1072 for adjusting the pressure maintained by the fluid regulator 1070. The high-pressure side of the fluid circuit 320 comprises a fluid supply connection 1050 and the fluid lines 341. The high-pressure side of the fluid circuit 320 further comprises a fluid reservoir 1040 and the fluid regulator 1070 in fluid communication with the fluid reservoir 1040.

In one aspect, as shown in FIG. 10, a shut-off valve 1075 is on the low-pressure side and in fluid communication with the fluid regulator 1070. In another aspect, the shut-off valve 1075—or a second shut-off valve (not shown)—is on the high-pressure side of the fluid circuit 320.

Figure 13:
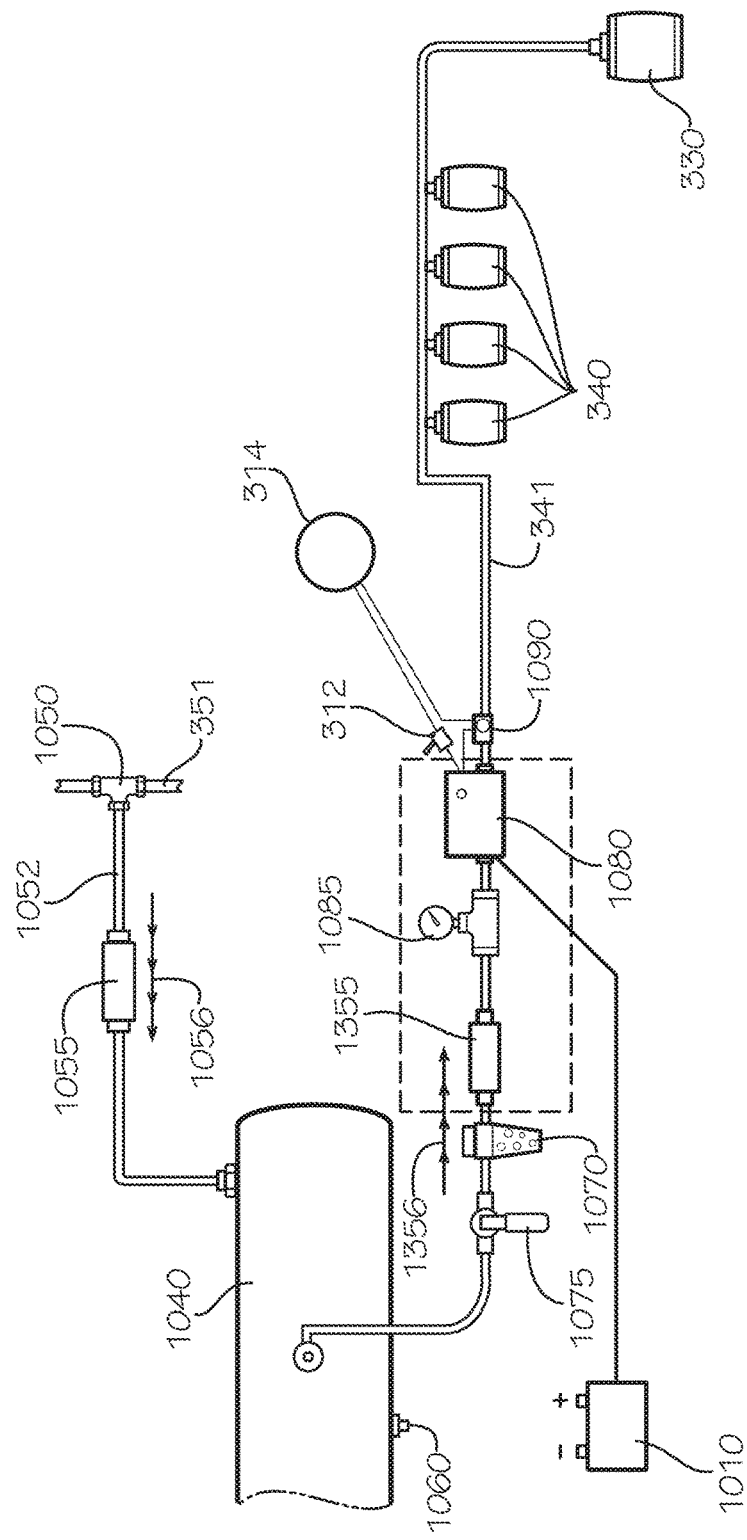
FIG. 13 is a schematic diagram for the on-board weighing system of the trailer of FIG. 1.

The low-pressure side of the fluid circuit 320 can comprise a pressure gage 1085 in fluid communication with the fluid regulator 1070 to display the pressure of the fluid on the low-pressure side of the fluid circuit 320. The low-pressure side of the fluid circuit 320 can further comprise a check valve 1355 (shown in FIG. 13) positioned between the fluid regulator 1070 and the pressure gage 1085 and configured to restrict flow of the fluid in only one direction 1356 (shown in FIG. 13). A pressure switch 1090, also part of the low-pressure side of the fluid circuit 320, is also in fluid communication with the fluid regulator 1070 and, as will be described below, can be configured to be adjustable among a plurality of pressure settings or setpoints.

A housing 1080 can be used to mount the pressure gage 1085 and also a lamp 1082 that can be used to signal whether electrical power is being supplied to the onboard weighing system 300 and in particular whether electrical power is being supplied to the pressure switch 1090, the mode switch 312 (shown in FIG. 1), and the load indicator 314 (also shown in FIG. 1). In one aspect, a power supply, shown as a battery 1010, supplies electrical power to the onboard weighing system 300. The battery 1010 shown in FIG. 10 is a standard DC (direct-current) battery but can be a solar-powered battery or any other power source sufficient to supply the required electrical power.

In one aspect, the load indicator 314 comprises a load indicator light and is in electrical communication with the pressure switch 1090. The mode switch 312 can comprise a rocker switch and is in electrical communication with the load indicator 314 and is configured to selectably supply power to the load indicator 314. The load indicator 314 can be configured to display a blinking light, a solid light, a light of a particular color, or it can be configured to emit an audible signal or alarm to the user once the preset threshold is reached. The onboard weighing system 300 can be configured to measure a load against any predetermined threshold value.

The high-pressure side of the fluid circuit 320 can further comprise a plurality of pipe or tubing elements for placing each of the fluid supply connection 1050, the check valve 1055, the fluid reservoir 1040, the fluid regulator 1070, and any other components on the high-pressure side in fluid communication with one another on the high-pressure side. The low-pressure side of the fluid circuit 320 can further comprise a plurality of pipe elements for placing each of the fluid regulator 1070, the check valve 1355, the pressure gage 1085, the pressure switch 1090, the axle air bags 340, and the fifth wheel air bag 330 in fluid communication with one another on the low-pressure side. The fluid circuit 320 can additionally comprise a bleed valve in fluid communication with a one of the aforementioned components and configured to vent fluid from the fluid circuit 320 such as after servicing the fluid circuit 320. Finally the fluid circuit 320 comprises a fluid such as, for example and without limitation, air. Any number of the aforementioned components of the onboard weighing system 300 can be housed within the housing 1080.

In one aspect, the components of the onboard weighing system 300 including components more directly exposed to the elements such as the mode switch 312 and the load indicator 314 and components that are less exposed to the elements such as those components located inside the chassis 200 can be configured to be waterproof, vibration-resistant, tamper-proof, and otherwise rated as would be the components for any component of a moving vehicle that is potentially exposed to water ingression or high or low temperatures as here—either during normal operation or cleaning and servicing.

Figure 11:
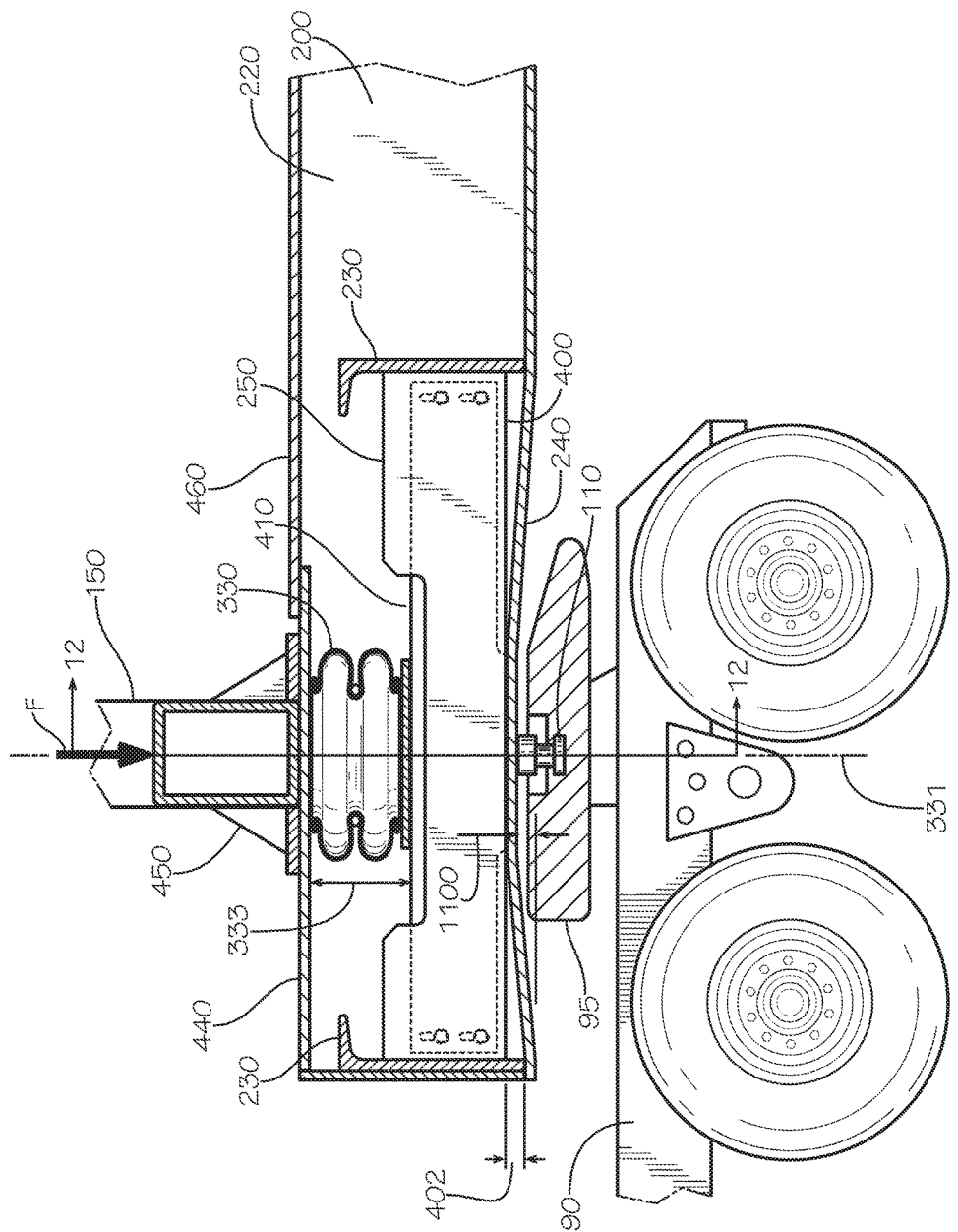
FIG. 11 is a sectional view of the trailer of FIG. 1 taken along line 4-4 of FIG. 2 with the trailer in a loaded condition.
Figure 12:
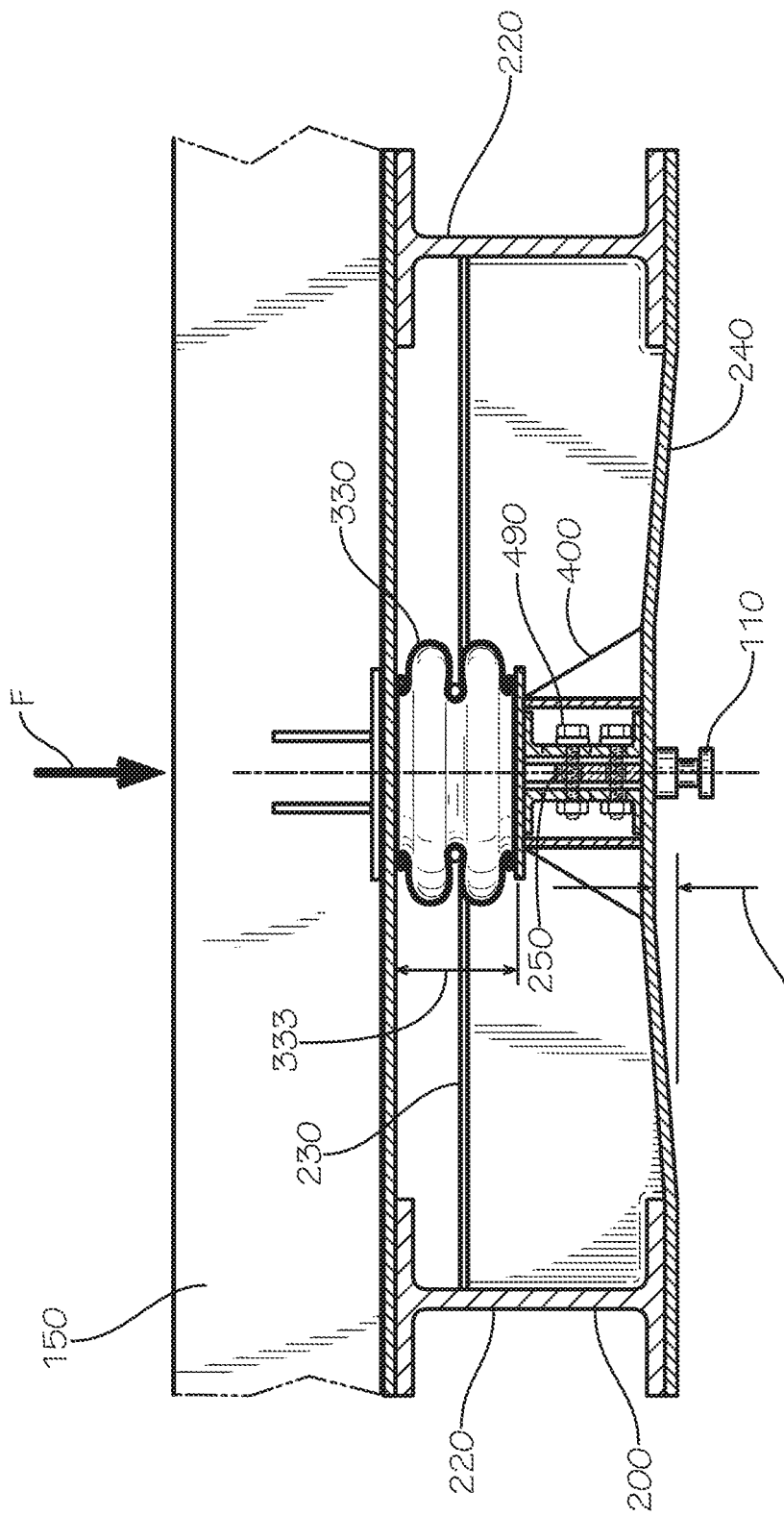
FIG. 12 is a sectional view of the trailer of FIG. 1 taken along line 12-12 of FIG. 11.

As shown in FIGS. 11 and 12, placing a load on the trailer 100 causes a force F resulting from the load to act on an upper portion of the chassis 200 while a lower portion of the chassis 200 including the kingpin 110 is supported by the vehicle 90. When the force F acts on the chassis 200, a portion of the floating coupling apparatus 400 that comprises the floating rail 410 is allowed to move between a lowest vertical position corresponding to an unloaded state and a highest vertical position corresponding to a loaded state and is thereby configured to move in a vertical direction relative to the chassis. Such movement results in a deflection 1100 of a portion of the fifth wheel plate 240 and also compression of the fifth wheel air bag 330. In one aspect, the amount of the deflection 1100 can be up to about 0.080 inches (in which case FIGS. 11 and 12 show a somewhat exaggerated degree of deflection). In another aspect, the deflection 1100 can greatly exceed 0.080 inches and more closely match the structure shown in FIGS. 11 and 12. In yet another aspect, the deflection 1100 can be less than 0.080 inches. The displacement-sensing device, which more specifically can be the fifth wheel air bag 330, is positioned between an attachment portion on the chassis 200 and an attachment portion on the floating coupling apparatus 400 and is thus configured to sense a load acting on the displacement-sensing device by deforming or compressing under the load, a pressure inside the fluid circuit 320 of the onboard weighing system 300 increasing as the load increases. For example and without limitation, the fifth wheel plate 240 can be formed from steel and have a thickness of ⅜ inch.

Compression of the fifth wheel air bag 330 results in a loaded height 333, which is defined between an inner surface of the top plate 440 and the top surface of the support plate 420. The inner surface of the top plate 440 and the top surface of the support plate 420 are in different positions relative to one another due to the movement of the one part of the chassis 200 with respect to the other part. As shown in FIG. 11, the size of the gap distance 402 can be set to limit the movement of the floating rail 410 with respect to the fixed rail 250. The length of each of the slots 480 can be set to limit movement of the floating rail 410 with respect to the fixed rail 250 and thereby prevent over-compression of the fifth wheel air bag 330. Whether the force F is a point force as shown or a distributed force, the bolster 150 or other structure of the chassis 200 helps distribute the force F to the floating coupling apparatus 400. Even if the load causing the force F is unevenly acting on the trailer 100 such that a greater downward force acts on the left side of the trailer 100 than on the right side of the trailer 100 or vice versa, the onboard weighing system 300 can still weigh the load because even an uneven load can cause movement of the floating coupling apparatus 400, causing the fifth wheel air bag 330 to compress.

In one aspect, the trailer 100 comprises the floating coupling apparatus 400, a displacement-sensing device coupled to the floating coupling apparatus 400 and configured to sense movement of the floating coupling apparatus 400 relative to the chassis 200, which can be the fifth wheel air bag 330, and the load indicator 314. In such aspect, a method of using the trailer 100 can comprise loading the trailer 100 with a load, measuring the displacement of a portion of the floating coupling apparatus 400 relative to the chassis 200 with the displacement-sensing device, the displacement being a difference between an unloaded height 332 and a loaded height 333, and signaling via the load indicator 314 when the load has reached the target load, or when a trailer weight has reached a target trailer weight. In another aspect where the displacement of a portion of the floating coupling apparatus 400 relative to the chassis 200 with the displacement-sensing device is not measured directly but rather is sensed through the measurement of a pressure inside the displacement-sensing device, it can be said that a method of using the trailer 100 comprises sensing displacement of a portion of the floating apparatus relative to the chassis with the displacement-sensing device.

The method of using the trailer 100 can further comprise turning a mode switch 312 of the trailer 100 to an "ON" or "LOAD" position, the ON position being the position in which the electrical circuit supplying power to the load indicator 314 is closed. The system can be placed in the "ON" or "LOAD" mode when the air bags are charged with pressure and the pressure switch 1090 and the load indicator 314 are electrically activated to measure the load on the trailer 100, while the system can be placed in an "OFF" or "MOBILE" or "travel" mode when the airbags are charged with pressure but the electrical components, including the pressure switch 1090 and the load indicator 314, are not activated. The method of using the trailer 100 can further comprise signaling when the load has reached an overloaded condition. The method of using the trailer 100 can further comprise compressing the fifth wheel air bag 330 by movement of the fixed rail 250 with respect to the floating rail 410. The method of using the trailer 100 can further comprise charging a portion of the fluid circuit 320 with a fluid such that the pressure of the high-side circuit is equal to or greater than a pressure setting of the fluid regulator 1070.

Figure 14:
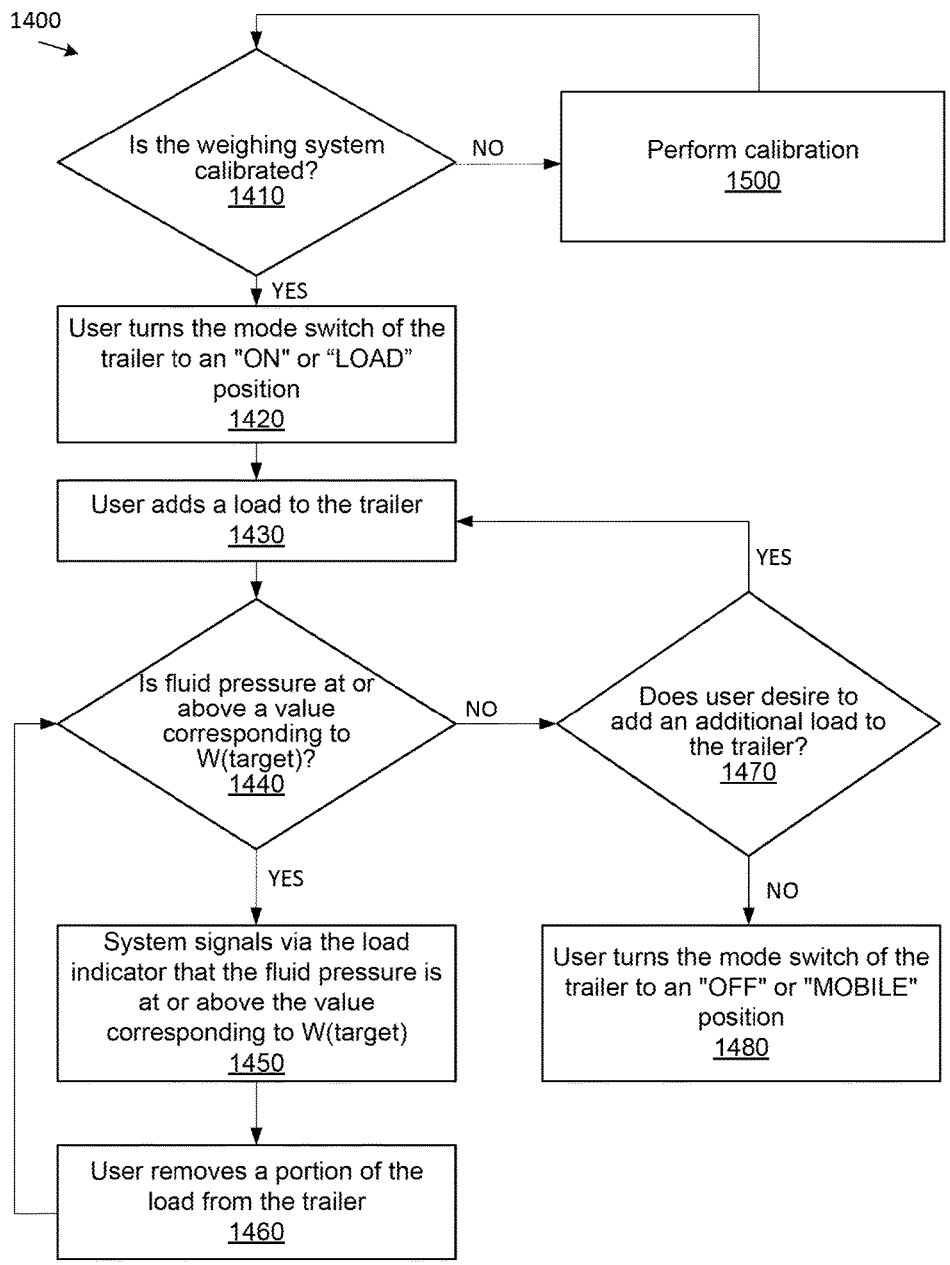
FIG. 14 is a flow chart of a method for using the on-board weighing system of the trailer of FIG. 1.

The flowchart in FIG. 14 describes a method 1400 of using the trailer 100 that first comprises a step 1410 for determining whether the onboard weighing system 300 is calibrated. While not shown in FIG. 14, the method 1400 of using the trailer 100 can optionally include a step for determining whether the onboard weighing system 300 is in the same condition as it should have been in when it was last calibrated if the proper steps were followed. In this step, the user determines whether the main power is on, whether the shut-off valve 1075 is open, and whether the air bag charge pressure, which is equal to the pressure of the fluid in the fluid circuit 320 on the lower-pressure side of the onboard weighing system 300, is equal to the pressure setting of the fluid regulator 1070. If the answer is "no," the user in a separate step can turn the main power on, open the shut-off valve, and increase the pressure on the high-pressure side as needed, e.g., by filling the fluid reservoir 1040 with additional fluid through the manual fill valve 1060, by increasing the supply of fluid from the fluid supply line 351, or by otherwise increasing the supply of fluid to the fluid lines 341. If the answer is "yes," the user can continue on to a step 1420 described below. In another aspect, when the fluid regulator 1070 does not comprise a gage or other feature that shows the pressure setting of the fluid regulator 1070, this step can be skipped or replaced. That portion of the step for determining whether the air bag charge pressure is equal to the pressure setting of the fluid regulator 1070 can comprise confirming that the high-pressure side of the fluid circuit 320 according to the pressure gage 1058 or its equivalent is equal to or greater than the pressure of the low-pressure side according to the pressure gage 1085 or its equivalent.

In the step 1420, the user turns the mode switch 312 of the trailer 100 to an "ON" or "LOAD" position. The user, in step 1430, then adds a load to the trailer 100. Next, the user in a step 1440 determines whether the fluid pressure is at or above a value corresponding to a trailer target weight W(target). If the fluid pressure is not yet at or above a value corresponding to a trailer target weight W(target), then the user determines in step 1470 whether he or she desires to add an additional load to the trailer 100. If the answer is "yes," the user repeats step 1430 to add an additional load to the trailer 100. If the answer is "no," the user in step 1480 can complete the loading process by turning the mode switch 312 of the trailer 100 to an "OFF" or "MOBILE" position. If instead the fluid pressure is at or above a value corresponding to a trailer target weight W(target), then in step 1450 the onboard weighing system 300 signals via the load indicator 314 that the fluid pressure is at or above the value corresponding to W(target), and the user in step 1460 removes a portion of the load from the trailer 100 and returns to step 1440.

If the onboard weighing system 300 is not calibrated, the user can calibrate the system as described below or in a method 1500 shown in FIG. 15. The method of using the trailer 100 can further comprise calibrating the onboard weighing system 300 by determining the target trailer weight; weighing the trailer 100 with an independent scale (not shown) after loading the trailer 100 with a load; and adjusting the pressure switch 1090 of the fluid circuit 320 to activate at the target trailer weight. The method of using the trailer 100 can further comprise pressurizing the fluid circuit with a fluid.

Figure 15:
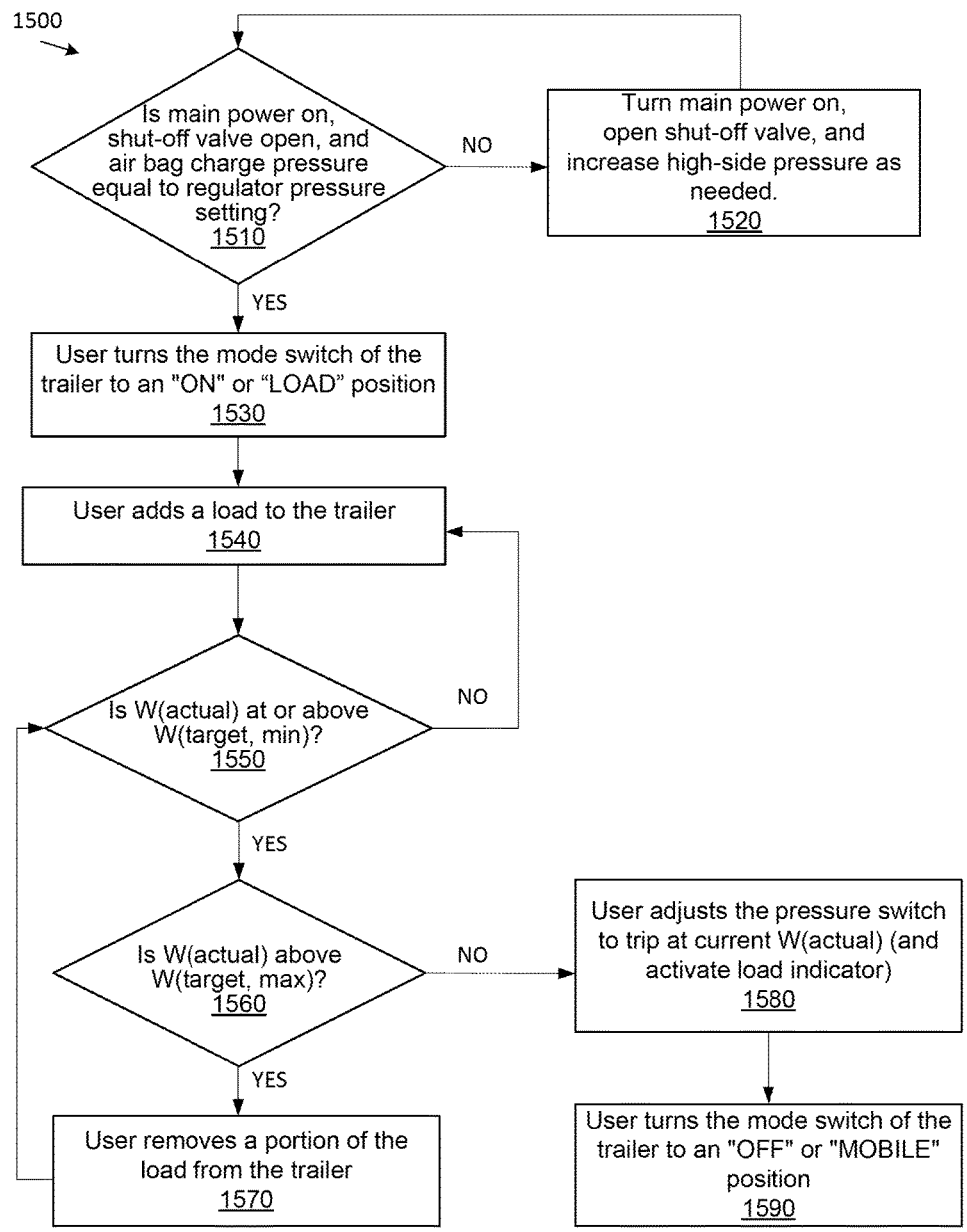
FIG. 15 is a flow chart of a method for calibrating the on-board weighing system of the trailer of FIG. 1.

The flowchart in FIG. 15 describes a method 1500 of calibrating the onboard weighing system 300 of the trailer 100 that first comprises a step 1510 for determining whether the onboard weighing system 300 is ready to be calibrated. In the step 1510, the user determines whether the main power is on, whether the shut-off valve 1075 is open, and whether the air bag charge pressure, which is equal to the pressure of the fluid in the fluid circuit 320 on the lower-pressure side of the onboard weighing system 300, is equal to the pressure setting of the fluid regulator 1070. If the answer is "no," the user in step 1520 can turn the main power on, open the shut-off valve, and increase the pressure on the high-pressure side as needed, e.g., by filling the fluid reservoir 1040 with additional fluid through the manual fill valve 1060, by increasing the supply of fluid from the fluid supply line 351, or by otherwise increasing the supply of fluid to the fluid lines 341. If the answer is "yes," the user in step 1530 turns the mode switch 312 of the trailer 100 to an "ON" or "LOAD" position. In another aspect, when the fluid regulator 1070 does not comprise a gage or other feature that shows the pressure setting of the fluid regulator 1070, this step can be skipped or replaced. That portion of the step 1510 can comprise confirming that the high-pressure side of the fluid circuit 320 according to the pressure gage 1058 or its equivalent is equal to or greater than the pressure of the low-pressure side according to the pressure gage 1085 or its equivalent.

The user, in step 1540, then adds a load to the trailer 100. At any point, based on a determination of the maximum allowable trailer weight depending on the country, state, or other jurisdiction, the user determines a target trailer weight range bounded on a lower end by a minimum target trailer weight W(target, min) and bounded on an upper end by a maximum target trailer weight W(target, max). In determining the target trailer weight range, the user can take into consideration the accuracy of the scales likely to be encountered by a user of the trailer in actual use, the specific accuracy of the onboard weighing system 300 in approximating the weight and signaling at the desired weight, and the type of load being carried on the trailer 100. In any case, the user in a step 1550, using a truck scale or other scale able to measure the weight of the trailer 100, determines whether the actual trailer weight W(actual) is at or above the minimum target trailer weight W(target, min). If the answer is "no," then the user repeats step 1540 to add an additional load to the trailer 100. If the answer is "yes," the user in a step 1560 determines whether the actual trailer weight W(actual) is at or above the maximum target trailer weight W(target, max). If the answer is "yes," the user in step 1570 removes a portion of the load from the trailer 100 and returns to step 1550. If the answer is "no," the user in step 1580 adjusts the pressure switch 1090 to trip, activate, or close the electrical circuit supplying power to the load indicator at the current trailer weight W(actual). Depending on the type of pressure switch, the adjustment can be as simple as rotating a portion of the pressure switch 1090 with a tool such as, for example and without limitation, a hex key (i.e., an Allen key or Allen wrench) or a flathead screwdriver. The user can know that the adjustment is correct because the adjustment will be just enough to activate the load indicator. The user in step 1590 can complete the loading process by turning the mode switch 312 of the trailer 100 to an "OFF" or "MOBILE" position.

It is contemplated that more than one pressure switch be utilized to signal multiple loading conditions. For example and without limitation, a second pressure switch (not shown) can be used to measure and signal an overloaded condition and cause the load indicator 314 or a second load indicator (not shown) to signal such condition to the user.

It is contemplated that measurement of the fluid pressure inside each of more than one fluid circuits can be measured. For example and without limitation, the fluid circuit 320 can be used to measure the load above a first portion of the trailer 100 and a second fluid circuit (not shown) with air bags in fluid communication therewith can be used to measure the load above a second portion of the trailer 100, and the two measurements can be compared with the purpose of identifying any load imbalance.

In one aspect, a pressure or charge on the low-pressure side of the fluid circuit 320 that is lower than the pressure setting of the fluid regulator 1070 may be an indication that the high-side pressure is too low, or it may be an indication that the pressure on the low-pressure side of the fluid circuit 320 is different than when the trailer 100 was last calibrated. Low pressure on the low-pressure side of the fluid circuit 320 could be caused by low pressure in the fluid supply line 351, one or more faulty check valves, a faulty fluid regulator 1070, an empty or under-filled fluid reservoir 1040, a shut-off valve that is OFF, or a leak somewhere in the fluid circuit 320. In one aspect, maintaining the pressure on the low-pressure side at a constant value—such as at the pressure setting for the fluid regulator 1070—causes the onboard weighing system 300 to remain calibrated as long as such settings are not changed. The pressure in the low-pressure side including the air bags is typically maintained at around 3 psi, and an air supply, which will optionally be at a much higher pressure (easily 10 to 30 times this value), is stepped down significantly by the fluid regulator 1070.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A trailer comprising:
a chassis defining a pair of cross members, each of the pair of cross members positioned substantially orthogonal to the longitudinal direction of the trailer and fixed in position with respect to the chassis;
a floating coupling apparatus coupled to the chassis between a first cross member and a second cross member of the pair of cross members, the floating coupling apparatus comprising:
a fixed rail suspended between and attached to each of the first cross member and the second cross member of the chassis;
a floating rail extending from a position proximate to the first cross member to a position proximate to the second cross member, the floating rail configured to move in a vertical direction relative to the fixed rail, the floating rail positioned adjacent to the fixed rail in a horizontal direction; and
a fifth wheel plate coupled to the floating rail;
a kingpin attached to the fifth wheel plate of the floating coupling apparatus, a portion of the fifth wheel plate proximate to the kingpin fixed in position with respect to the floating rail;
a displacement-sensing device positioned between an attachment portion on the chassis and an attachment portion on the floating coupling apparatus, the displacement-sensing device configured to sense a load acting on the displacement-sensing device; and
a fluid system in fluid communication with the displacement-sensing device.

2. The trailer of claim 1, wherein the displacement-sensing device is a fifth wheel air bag.

3. The trailer of claim 2, further comprising an axle air bag positioned between an attachment portion on the chassis and an axle of the trailer and in fluid communication with the fifth wheel air bag.

4. The trailer of claim 2, further comprising a pressure switch in fluid communication with the fifth wheel air bag.

5. The trailer of claim 4, wherein the pressure switch is adjustable between a plurality of setpoints.

6. The trailer of claim 4, further comprising a load indicator in communication with the pressure switch, the load indicator configured to signal that a pressure corresponding to a target trailer weight has been reached.

7. The trailer of claim 6, wherein the load indicator comprises a load indicator light.

8. The trailer of claim 6, further comprising a mode switch in communication with the load indicator, the mode switch configured to selectably supply power to the load indicator.

9. The trailer of claim 2, wherein the kingpin and the fifth wheel air bag are aligned along a common axis.

10. A weighing system for a trailer, the system comprising:
a floating coupling apparatus comprising:
a fifth wheel plate;
a kingpin fixably attached to the fifth wheel plate and configured to slideably and lockably fit within a coupling aperture defined in a fifth wheel of a vehicle configured to pull the trailer;
a fixed rail attached to a chassis of the trailer, the fixed rail comprising a substantially vertical portion resistant to deflection between a first end and a second end of the fixed rail; and
a floating rail slideably attached to the fixed rail, the floating rail comprising a substantially vertical portion resistant to deflection between a first end and a second end of the floating rail, the floating rail configured to move in a vertical direction with respect to the fixed rail; and
a displacement-sensing device positioned above each of the fixed rail and the floating rail, the displacement-sensing device configured to sense a load acting on the displacement-sensing device through the floating rail.

11. The system of claim 10, wherein the substantially vertical portion of a one of the fixed rail and the floating rail defines a slot, the system further comprising a fastener extending through the slot in a substantially horizontal orientation, the fastener configured to limit movement of the floating rail with respect to the fixed rail to a specific range.

12. The system of claim 10, wherein the displacement-sensing device is an air bag secured to the floating rail.

13. A method of using a trailer, the method comprising:
loading the trailer with a load, the trailer comprising:
a chassis defining a pair of cross members, each of the pair of cross members comprising a substantially vertical portion resistant to deflection between a first end and a second end of the respective cross member;
a floating coupling apparatus coupled to the chassis between a first cross member and a second cross member of the pair of cross members, the floating coupling apparatus comprising:
a fixed rail of the floating coupling apparatus suspended between and attached to each of the first cross member and the second cross member of the chassis; and
a floating rail of the floating coupling apparatus extending from a position proximate to the first cross member to a position proximate to the second cross member, the floating rail configured to move in a vertical direction relative to the fixed rail, the floating rail positioned adjacent to the fixed rail in a horizontal direction;
a displacement-sensing device coupled to the floating coupling apparatus; and
a load indicator;
measuring displacement of a portion of the floating coupling apparatus relative to the chassis with the displacement-sensing device; and signaling via the load indicator when the displacement of the portion of the floating coupling apparatus corresponds with a trailer weight reaching a target trailer weight.

14. The method of claim 13, further comprising turning a mode switch of the trailer to an "ON" position, the "ON" position being the position in which an electrical circuit supplying power to the load indicator is closed.

15. The method of claim 13, further comprising signaling when the trailer weight has reached an overloaded condition.

16. The method of claim 13, wherein the displacement-sensing device comprises an air bag, the fixed rail attached to a chassis of the trailer; the floating rail slideably attached to the fixed rail, and the air bag attached to the floating rail and positioned between the floating rail and a portion of the chassis; the method further comprising compressing the air bag by movement of the fixed rail with respect to the floating rail.

17. The method of claim 13, further comprising:
determining the target trailer weight;
weighing the trailer with an independent scale after loading the trailer with a load; and
adjusting a pressure switch of the fluid system to activate at the target trailer weight.

18. The method of claim 17, further comprising pressurizing the fluid system with a fluid.

19. The method of claim 13, wherein the displacement-sensing device comprises an air bag and wherein measuring the displacement of a portion of the floating coupling apparatus relative to the chassis with the air bag comprises measuring a fluid pressure inside the fluid system with a pressure switch.

20. The trailer of claim 1, wherein the floating rail is slidably attached to the fixed rail by a plurality of fasteners extending in a direction substantially orthogonal to the longitudinal direction of the trailer.

* * * * *